United States Patent
Von Hackewitz

(10) Patent No.: US 6,471,411 B2
(45) Date of Patent: Oct. 29, 2002

(54) SELF-CONTAINING FULL-COMPLEMENT ROLLER BEARING CAGE

(76) Inventor: Friedrich-Wilhelm Von Hackewitz, Lauerweg 2, 97422 Schweinfurt (DE)

( * ) Notice: Subject to any disclaimer, the term of this patent is extended or adjusted under 35 U.S.C. 154(b) by 3 days.

(21) Appl. No.: 09/818,995

(22) Filed: Mar. 27, 2001

(65) Prior Publication Data

US 2002/0021848 A1 Feb. 21, 2002

(30) Foreign Application Priority Data

Mar. 28, 2000 (DE) .......................................... 100 15 406

(51) Int. Cl.⁷ ............................ F16C 33/46; F16C 29/06
(52) U.S. Cl. ............................ 384/574; 384/44; 384/51; 384/579
(58) Field of Search ........................... 384/51, 44, 572, 384/574, 578, 579, 553, 555, 567

(56) References Cited

U.S. PATENT DOCUMENTS

| | | | | |
|---|---|---|---|---|
| 236,517 A | * | 1/1881 | Vaughn | 384/574 |
| 502,025 A | * | 7/1893 | Avery | 384/565 |
| 718,122 A | * | 1/1903 | Henderson | 384/553 |
| 1,177,300 A | * | 3/1916 | Brenzinger | 384/578 |
| 3,219,398 A | * | 11/1965 | Anderson | 384/44 |
| 3,400,991 A | * | 9/1968 | Haller | 384/578 |
| 3,704,919 A | * | 12/1972 | Titt | 384/44 |
| 6,022,147 A | * | 2/2000 | Murai et al. | 384/574 |

* cited by examiner

Primary Examiner—Thomas R. Hannon
(74) Attorney, Agent, or Firm—Amster, Rothstein & Ebenstein

(57) ABSTRACT

A self-containing full-complement cage for a flow-medium lubricated roller bearing includes long-rollers and short-rollers, which are arranged alternatively one after another in rolling direction. The cage has a pair of side plates (10, 11) one on either side of the rollers. Each short-roller has a central cylindrical bore (7). A shaft (14) passes axially through each bore (7) with radial play and along a center-line (15) of the short-roller. During operation of the bearing equipped with this cage, part of the ambient lubricant in the axial bore of the short-rollers becomes centrifugally pushed towards the side ends of the short-rollers and from there it is flung radially outwardly towards the outer surface of the adjacent long rollers. In this way there is effected a continuous distribution of flowing lubricating medium environment both to the outer surface of the long rollers and to the guiding surfaces ofthe recesses of the side plates, which closely slide on this outer surface.

11 Claims, 3 Drawing Sheets

Fig. 1
Fig. 2
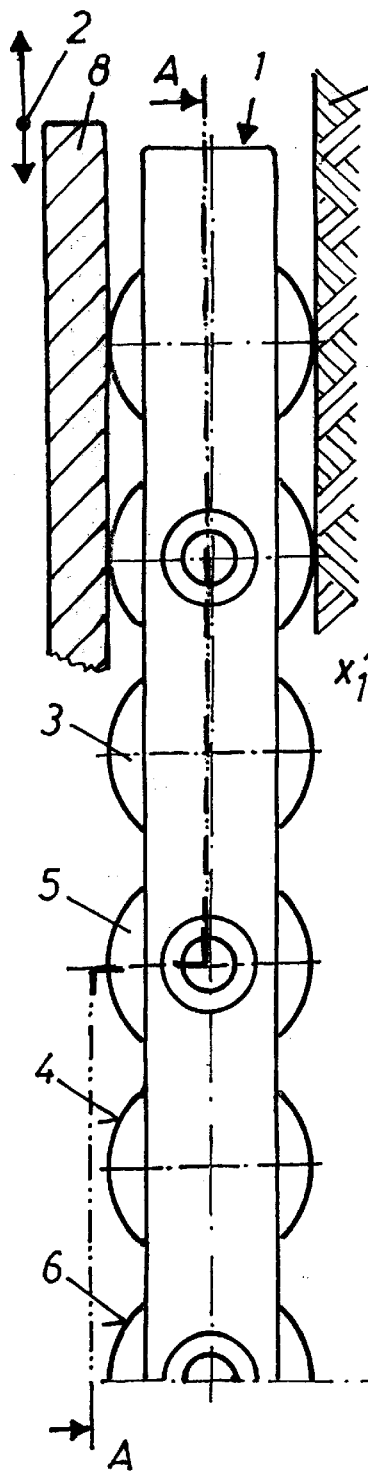
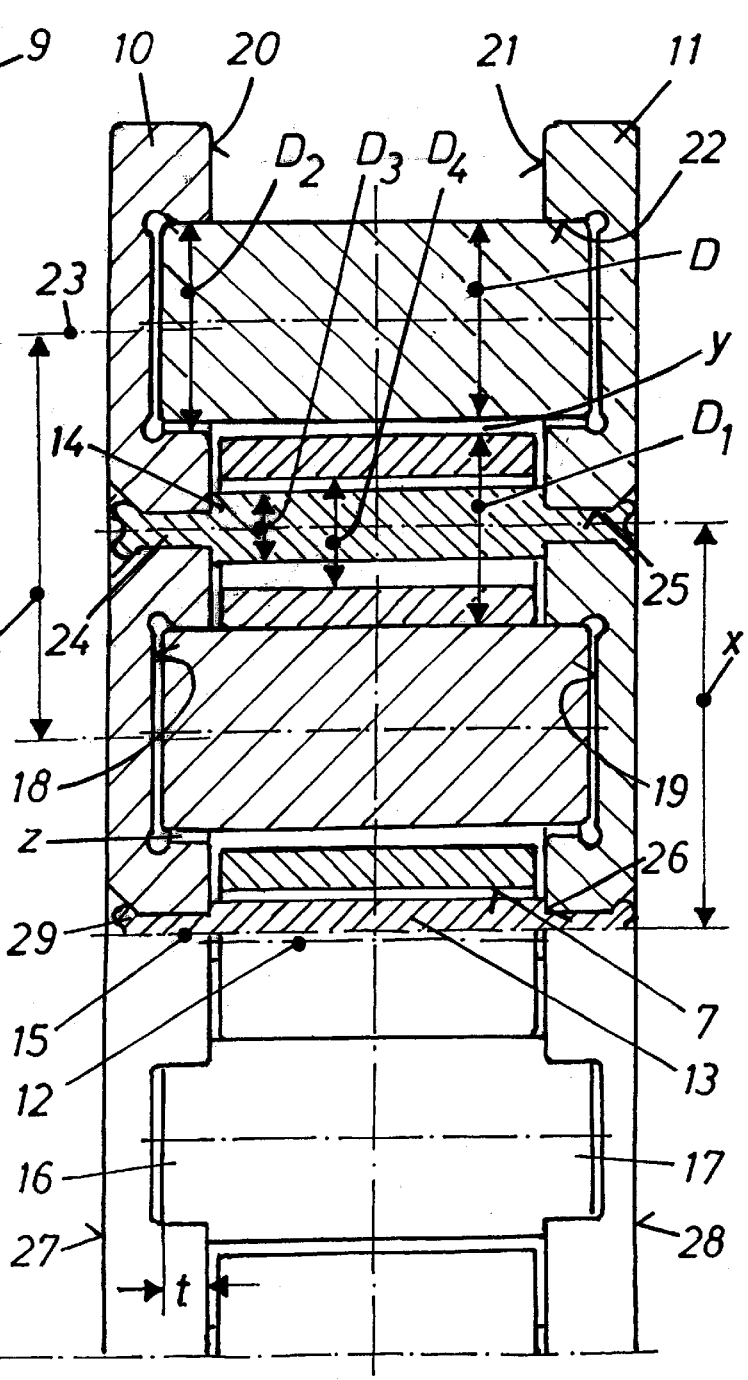

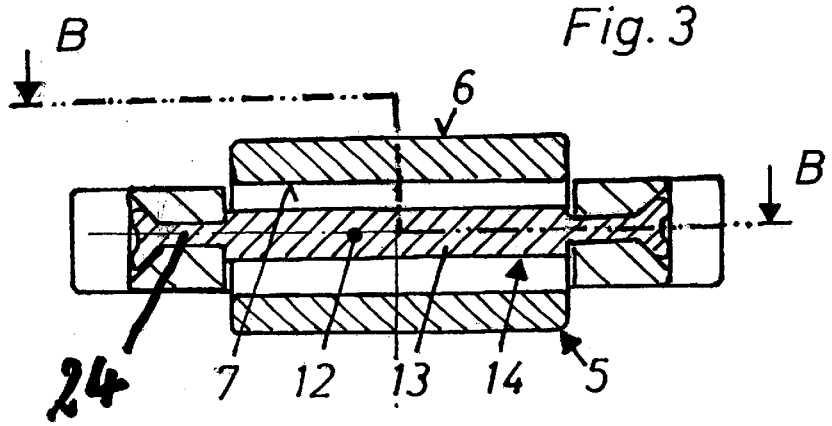
Fig. 3
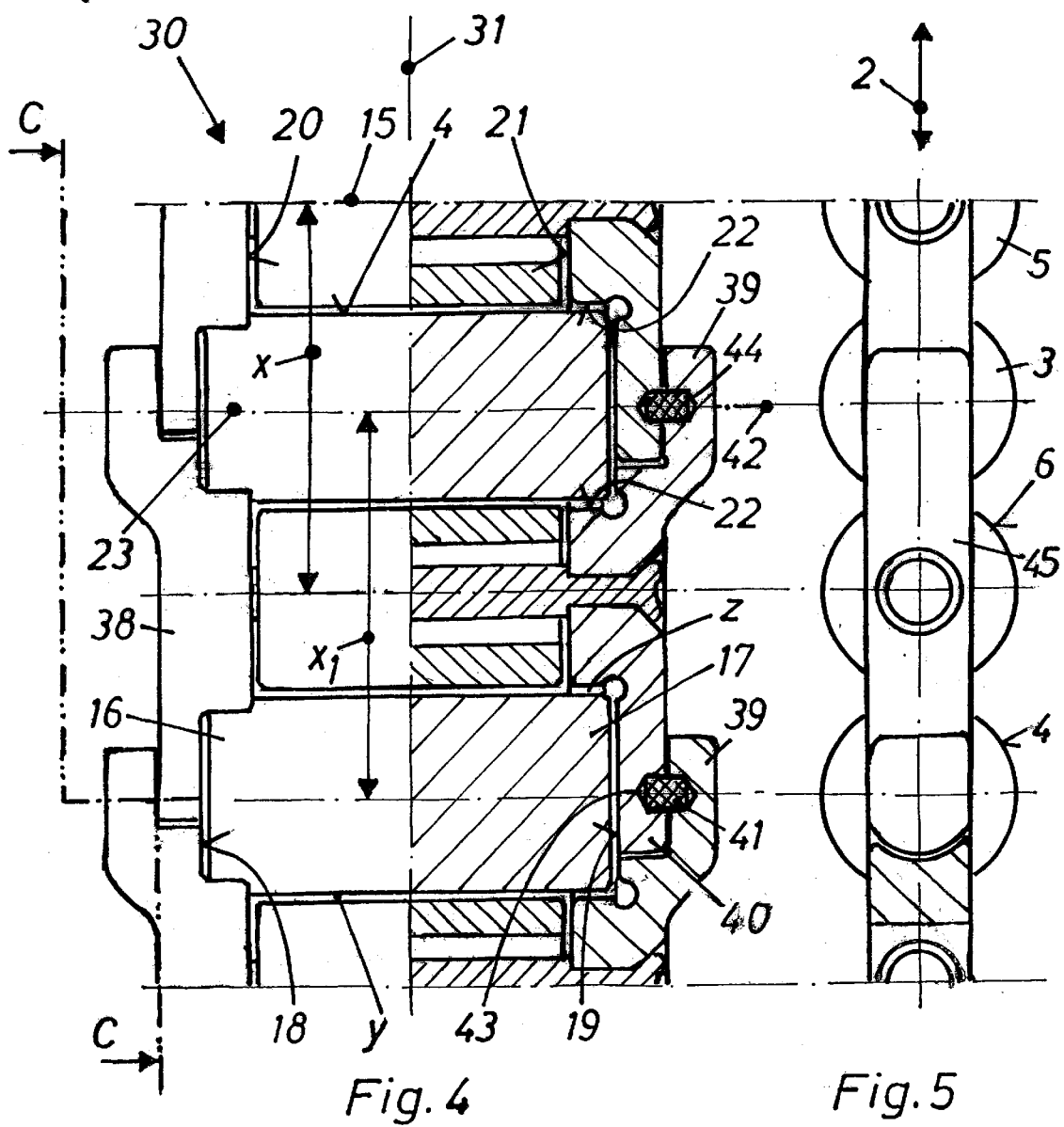
Fig. 4
Fig. 5

SELF-CONTAINING FULL-COMPLEMENT ROLLER BEARING CAGE

FIELD OF THE INVENTION

The present invention relates to a self-containing full-complement roller bearing cage.

BACKGROUND OF THE INVENTION

A self-containing cage for a rotative roller bearing is known, which has two side plates fastened to each other by means of bolts and which contains cylindrical rollers, the ends of which penetrate at either side into a deepening of an adjacent side plate (U.S. Pat. No. 502,025). At this known cage the bolts are placed between the rollers, so that neighbored rollers have a relatively large distance between each other around the circumference, thus only a relatively small number of rollers can be built into the bearing which often causes a too small load carrying capacity of the bearing per unit length of raceway.

Another self-containing cage for a rotative roller bearing is known, which has hollow cylindrical rollers, each roller having a through-going central hole, whereby a bolt penetrates axially through each hole and both ends of each bolt are rigidly fastened onto a side plate at the corresponding side of the cage (U.S. Pat. No. 236,517). This other known cage can be made as a full-complement unit, so that it contains an optimal large number of rollers on its circumference. However, an important disadvantage is to be seen in the fact, that every roller must be slidingly held and centered on its bolt during bearing operation. The contacting sliding surfaces between roller and bolt are difficult to maintain continuously lubricated with the indispensable lubricant, grease or oil, because in case the flowing lubricating medium is placed between the hole and the bolt it will be flung out of the bore of the rotating roller by the effect of centrifugal force, the medium flings radially outwardly, thereby being taken away from the sliding surfaces of the bore of the roller, where it is intended to lubricate and to protect against sliding wear. Therefore, in this other known cage there can develop easily a detrimental sliding wear in the bore between roller and bolt, which makes the sliding gap between the rollers and the bolt growing larger. The rollers of the cage then begin to inadmissibly oscillate during operation and to run obliquely. This again adds to the wear in the roller bores, thus this wear becomes greater and increases faster. Especially during running with high bearing load, there is produced an additional parasitical contact wear on the raceways of the roller bearing, because the obliquely running rollers do not roll properly on their raceways. In some cases where the oblique position of the rollers in the known cage has become great enough, these rollers may even produce a catastrophical blockade of the bearing during operation.

OBJECTS AND SUMMARY OF THE INVENTION

One object of the present invention is therefore to establish a self-containing full-complement bearing of the defined kind, in which the sliding wear in the flow medium lubricated cage is considerably reduced, in as much as a detrimental greater oblique position of the rollers in the cage is avoided even during long operation time and heavy bearing load.

A further object of the present invention is to provide a cage which can be manufactured extremely economically by using simple manufacturing means.

With the cage of this invention both ends of the cylindrical long-rollers of the cage are in part embraced on their outer surface by part-cylindrical guiding surfaces of recesses in the side plates of the cage, whereby the long rollers are properly, i.e. without obliquity, held by the narrowly guiding surfaces in the recesses. In addition the cage is carried by said guiding surfaces on the outer surface of the long rollers in the roller bearing. During operation of the bearing equipped with said cage, part of the ambient lubricant in the axial bore of the short-rollers becomes centrifugally pushed towards the side ends of the short-rollers and from there it is flung radially outwardly towards the outer surface of the adjacent long rollers. In this way there is effected a continuous distribution of flowing lubricating medium environment, for instance of an oil bath, both to the outer surface of the long rollers and to the guiding surfaces of the recesses of the side plates, which closely slide on this outer surface.

The cylindrical outer surface of each short-roller can slidingly contact the cylindrical outer surface of the neighboring long-roller, when during operation of the roller bearing a small, constructively defined running play between these two rollers is overcome. After the running through of this play, these two rollers slightly impact each other on their mutual cylindrical outer surfaces, this impact producing an alignment of the short rollers on the long-rollers. The mass inertia forces of the mutual impact are rather small, because the short-rollers have a relatively small mass, which is smaller than the mass of the long-roller.

Even during long-time operation with high bearing load the magnitude of the running play between the outer surfaces of adjacent long-roller and short-roller does not change, this is because of the relatively small mass forces and because of continuous distribution of the lubricating medium into the contacting outer surfaces, which makes the mutual impact and corresponding sliding wear on these surfaces to be of negligible importance.

The long-rollers of the cage are closely held and slidingly guided in the recesses of the two side-plates, which are positioned against each other by bolts, so that the long-rollers can not fall out of the cage. The central bore of each short roller is passed through axially by one bolt. By this way, each short-roller is held in the non-mounted cage by its bolt and restrained from falling out of the loose cage. The cage of this invention, therefore, forms a self-containing machine element, which can easily be mounted and dismounted, for instance, when the raceways of the roller bearing have to be inspected after a certain running period of the roller bearing.

Moreover, the cage of this invention has a full complement of rollers, so that an exceptionally high number of rollers per unit raceway length participate to carry the bearing load. This brings about the fact, that a roller bearing, which is equipped with the cage of this invention has a relatively high bearing capacity.

A second embodiment of this invention has the effect, that there is an extremely and unusually small play between the cylindrical outer surfaces of long-roller and adjacent short-roller in the cage, so that an optimally high number of rollers per unit raceway length is present. The mass forces during the mutual impacts between long-roller and short-roller are concomitantly kept advantageously small because of this very small play.

In a third embodiment, the long-rollers of the cage has an optimally narrow sliding gap in the pertinent recesses of the side plates at their both ends. This produces the advantage, that each long-roller is freely rotative and, thereby, guided in those recesses without obliquity.

In a fourth embodiment, both ends of the long-rollers are slidingly contacted and guided by sufficiently wide surface sections of the guiding surfaces of the side plates' recesses. Thereby, an unacceptably high contact pressure force and a corresponding detrimental contact wear on these surface sections is avoided during bearing operation.

In a fifth embodiment, the solid longrollers take a larger portion of the bearing's loading than the hollow shortrollers, this is because of the higher stiffness and the higher resistance of the long-rollers against radial compression in comparison to the softer hollow shortrollers, the wall of which deflect somewhat during radial compression in the loaded roller bearing.

In case the load on the roller bearing is increased and the two raceways of the bearing, between which the elastic rollers run, approach each other somewhat, then the loading on the relatively stiff long-rollers become increased more rapidly than the loading on the adjacent, elastically more easily compressible short-rollers. Therefore, during increase of the roller bearing's load the long-rollers carry a concomitantly growing part of the roller bearing's load. This feature brings the effect, that the relatively soft short-rollers of the cage having less strength are not becoming overloaded even in case where the roller bearing carries very high bearing loads.

BRIEF DESCRIPTION OF THE DRAWINGS

The self-containing full-complement roller bearing cage according to the invention will ow be described in detail by way of example using the following drawings, wherein:

FIG. 1 shows a side view of a part of a self-containing fullcomplement bearing for a simple linear roller bearing, FIG. 2 shows a fractionally cut view along the line A—A in FIG. 1, FIG. 3 shows a cross section through part of a modified self-containing fill-complement cage for a linear roller bearing having a linear raceway with joining recirculating raceways, FIG. 4 shows a fractionally cut view along the line B—B in FIG. 3, FIG. 5 shows a fractionally cut view along the line C—C in FIG. 4.

DETAILED DESCRIPTION OF THE INVENTION

Figure 6:
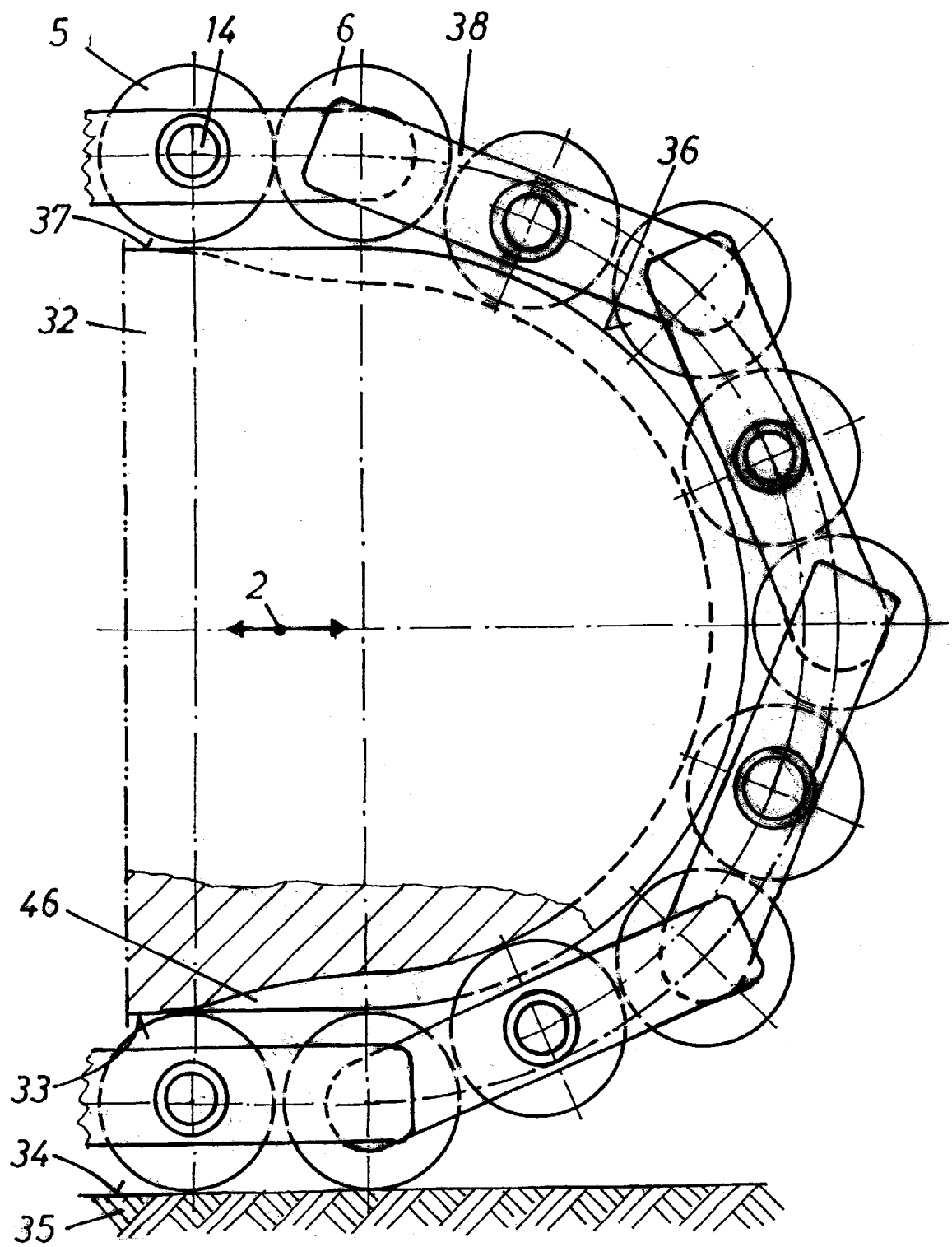
FIG. 6 shows a side view of a part of the cage of FIGS. 3, 4 and 5.

In FIG. 1, 1 designates a full-complement cage, which has in rolling direction 2 alternatively arranged long-rollers 3 having a cylindrical outer surface 4 and short-rollers 5 having a cylindrical outer surface 6. The outer surface 4 of each long-roller 3 has a diameter D and the outer surface 6 of each short-roller 5 has a diameter $D_1$.

Each short-roller 5 has a central axial bore 7 with a bore diameter $D_4$. As commonly known for the function of a simple linear roller bearing the cage I moves in rolling direction 2 between a back and forth movable loaded bearing plate 8 having a plane raceway for the rollers 3, 5 of the cage 1 and a fixed base plate 9 having a plane counter raceway.

At the present example the magnitude of the outer diameter D of the long-rollers 3 is exactly the same as the magnitude of the diameter $D_1$ of the outer diameter 6 of the short-rollers 5. Both, the long-rollers 3 and the short-rollers 5 are made out of one and the same elastic material, for example, bearing steel. The long-rollers 3 of, the cage 1 are made solid having no central bore. In case of an increase of load on the roller bearing the relatively stiff solid long-rollers 3 take one part of the bearing load which is successively greater than the other part of the bearing load taken by the not so stiff hollow short-rollers 5. The bore 7 of the hollow short-rollers 5 will become slightly oval due to elastic deformation during high bearing loading.

The cage 1 has two identically formed plane side plates 10, 11 one on either side of the rollers 3, 5. These two side plates 10, 11 are rigidly fixed against each other by rotationally symmetric shafts 14, these shafts 14 having a cylindrical middle portion 13, which at the height of the roller center line 12 pass through the bore 7 of the corresponding short-roller 3. The side plates 10, 11 may be manufactured out of a metallic material, for instance brass, or out of a fluorine containing plastic material, which is filled with a solid lubricant, for instance graphite or molybdenumdisulfide.

Between each shaft 14 and its short-roller 3 there is provided a radial play, the magnitude of which is defined by the difference of the diameter $D_4$ of the bore 7 of the short roller 3 and the diameter $D_3$ of the middle portion 13 of the shaft 14. Each shaft 14 has a center line 15. The center lines 15 of two in rolling direction 2 neighboring shafts 14 have a mutual distance X which has the same magnitude as the diameter D of the outer surface 4 of the long-rollers 3 plus the diameter $D_1$ of the outer surface 6 of the short-rollers 5 plus a certain small mutual running play Y between the outer surface 4 of each long-roller 3 and the outer surface 6 of the adjacent short-roller 5. In the present example the magnitude of the mutual running play Y is about 4% of the diameter D of the outer surface 4 of the long-roller 3.

Each long-roller 3 has two opposite ends 16 and 17 penetrating into a roller guiding holding recess 18 and 19 respectively. The recesses 18 and 19 are formed in adjacent inner surfaces 20 and 21 respectively of corresponding side plates 10 and 11 respectively. Each holding recess 18 and 19 has a pair of opposed, concentric, part-cylindrical guiding surfaces 22 having a common center line 23 normal to the rolling direction 2. The pair of part-cylindrical guiding surfaces 22 of each holding recess 18 and 19 have a common diameter $D_2$, which is slightly greater than the diameter D of the outer surface 4 of the long-roller 3.

The outer surface 4 of each roller end 16 and 17 respectively is narrowly held along its circumference by the two guiding surfaces 22 of the corresponding holding recesses 18 and 19 respectively, so that the long-rollers 3 do not fall out of the loose cage 1. A small guiding play Z is maintained between the outer surface 4 of the long-roller 3 and the guiding surfaces 22 of each holding recess 18 and 19 as a result of the difference between the greater diameter $D_2$ of the guiding surfaces 22 and the smaller diameter D of the outer diameter 4 of the long-roller 3 (FIG. 2). In the present example the magnitude of the guiding play Z is about 3% of the diameter D of the outer surface 4 of the longroller 3.

The two guiding surfaces 22 of each holding recess 18 and 19 comprise a surface section which bears on the outer surface 4 of a corresponding long-roller 3, this section having a width "t" extending in the direction of the center line 23 of the guiding surfaces 22. The magnitude of the width "t" is about 20% of outer diameter D of the outer surface 4 of the long-roller 3.

The mutual distance X, in the rolling direction 2, of two center lines 15 of two neighboring shafts 14 has the same magnitude as the mutual distance $X_1$, of the center-lines 23 of two neighboring holding recesses 18 and 19 respectively of the two side plates 10 and 11 (FIG. 2). The radial play between the middle portion 13 of each shaft 14 and the bore 7 of a short-roller 5 is greater than the guiding play Z of the ends 16 and 17 of the long-rollers 3 in the corresponding holding recess 18 and 19 respectively plus the mutual running play Y between long-roller 3 and short-roller 5. As a result, the short-rollers 5 of the cage 1 are put into a non-oblique position merely by their running against a neighboring long-roller 3 during operation in the roller bearing and, thus, they are always guided to roll in the rolling direction properly.

Every shaft 14 has a reduced portion 24 at either of its ends, which joins the middle portion 13. Each reduced portion 24 penetrates into a hole 25 in the corresponding side plate 10, 11. The inner surface 20 and 21 respectively of the side plate 10 and 11 respectively rests against a shoulder 26 of each shaft 14, this shoulder 26 being located at the joint between the middle portion 13 and the corresponding reduced portion 24 of the shaft 14. As seen in FIG. 2, both reduced portions 24 of each shaft 14 penetrate through a hole 25 formed in the corresponding side plate 10 and 11 respectively from the inside to the outside of the plates 10, 11. The shafts 14 are made from a non-alloyed steel. They have an end portion 29 which protrudes beyond an outer side face 27 and 28 respectively of the corresponding side plate 10 and 11 respectively. This end portion 29 is enlarged by riveting so as to become placed against the corresponding outer side face 27 and 28 respectively of the corresponding side plate 10 and 11 respectively.

In FIGS. 3, 4 and 5 there is shown a modified self-containing full-complement cage 30, which has been built symmetrically to a middle plane 31. This cage 30 is mounted onto a bearing shoe 32 of a linear roller bearing, as can be seen in FIG. 6. The shoe 32 becomes moved linearly back and forth during operation, thereby carrying a bearing load via the cylindrical long-rollers 3 and the cylindrical short-rollers 5 of the cage 30 along a loaded linear plane raceway 33 of the shoe 32 onto a plane counter raceway 34 of a fixed base plate 35. The long-rollers 3 and the short rollers 5 roll along the linear raceway 33 into one of two half-cylindrical reversing raceways 36, which are arranged on either end of the bearing shoe 32. From there they roll into a non-loaded plane linear return raceway 37 of the bearing shoe 32 (FIG. 6).

Similar to the previous embodiment, the long-rollers 3 and the short-rollers 5 are arranged alternatively one after another in the cage 30 in rolling direction 2. The long-rollers 3 are also again built solid and the short-rollers 5 have a central cylindrical bore 7. The cage 30 possesses two side plates, one arranged on either side of the rollers 3, 5. The side plates are also fixed against each other by shafts 14. Each shaft 14 has a middle portion 13, which penetrates with radial play through the bore 7 of the corresponding short-roller 5 at the height of the center line 12 of the short-roller 5. Each long-roller 3 has an end portion 16 and 17 respectively on either side, which enters into a holding recess of an adjacent inner surface 20 and 21 respectively of the corresponding side plate. Each holding recess 18, 19 has a pair of opposed part-cylindrical guiding surfaces 22 with a common center line 23, the center-line 23 normally crossing the rolling direction 2.

As seen in FIGS. 3, 4 and 5, the modified cage 30 has side plates, which are divided into plate links 38 which are arranged in rolling direction 2 in line one after another. Each plate link 38 has an end portion 39 and 40 respectively. The end portions 39, 40 of two neighboring plate links 38 overlap each other. At the place of overlapping there is arranged a cylindrical pivot pin 41. The pivot pin 41 has a center line 42, which coincides with the center line 23 of the guiding surfaces 22 (FIG. 4).

Both ends of each pivot pin 41 slidingly penetrate into a cylindrical pivot hole 43 and 44 respectively. The holes 43, 44 are arranged in line with each other, whereby the pivot hole 43 is formed in the end portion 40 and the pivot hole 44 is formed in the end portion 39 of the respective link 38. Thus, two neighboring links 38 are held to freely swivel around the center-line 42 of the common pin 41. The pins 41 can be manufactured from a wear resistant plastic material, which is filled with a wear reducing solid lubricant. In this case the cage 30 with its links 38 forms an endless chain, which is mounted around the bearing shoe 32.

Each shaft 14 passes through the bore 7 of the corresponding short-roller 5. At both ends of the middle portion 13 of the shaft 14 there is formed a reduced portion 24, which is rigidly connected to a middle portion 45 of one plate link 38 of the corresponding side plate by riveting.

The reversing raceway 36 of the bearing shoe 32 has a groove 46, which extends along the raceway 36 in a recirculating rolling direction. The groove 46, having a width greater than the length of the short rollers 5, receives and guides the recirculating short-rollers 5 therein.

As in the first embodiment described above, there are center-lines 15 of neighboring shafts 14 in the cage 30, which have a mutual distance X in the rolling direction 2 having the same magnitude as the mutual distance $X_1$, in rolling direction 2 of the two center-lines 23 of neighboring recesses 18, 19 of the links 38 of the cage 30 (FIGS. 4 and 5).

The radial play between the middle portion 13 of each shaft 14 and the bore 7 of the corresponding short-roller 5 is greater than the guiding play Z of the ends 16, 17 of the long-rollers in their holding recess 18 and 19 in the links 38 of the corresponding side plate plus a small running play y between the outer surface 4 of each long-roller 3 and the adjacent outer surface 6 of the corresponding short roller 5 (FIGS. 3 and 4). In this manner the orientation of the short-rollers 5 of the cage 30 is maintained non-obliquely during operation by merely running against a neighboring long-roller 3.

Further considerable modifications of the above demonstrated examples are possible within the scope of this invention. For example, both side plates of the cage may be made of one piece and formed circularly, so that the corresponding ring-type cage can be installed into a common rotative cylindrical roller bearing.

If a certain distribution of load between the long-rollers and the short-rollers, both manufactured from an elastic material, for instance bearing steel, is intended to be obtained, then the diameter D of the long-rollers of the cage can be made somewhat smaller or somewhat greater than the diameter $D_1$, of the short-rollers, based on the desired different elastic compressive yielding of the long-rollers during operation.

I claim:

1. A self-containing full-complement cage for a flow medium lubricated roller bearing comprising long-rollers and short-rollers arranged alternatively one after another in rolling direction and a side plate, one on either side of the rollers, each short-roller having an axially through-going central cylindrical bore, a middle portion of a shaft penetrating through this central bore with radial play, the shaft having opposite end portions joining the middle portion, which are rigidly fixed onto the corresponding adjacent side plate, whereby a small clearance is kept between a cylindrical outer surface of each long-roller and a cylindrical outer surface of the neighboured short-roller, and whereby there are two ends on each long-roller, one on either side, both penetrating into a holding recess in an adjacent inner side face of the corresponding side plate and whereby said recess has two opposite part-cylindrical guiding surfaces with a common center-line extending rectangularly to the direction of rolling, these guiding surfaces of each recess embracing the outer surface of the corresponding end of the long-roller narrowly, characterized in that:

the center-lines (15) of two neighboring shafts (14) of the cage (1, 30) have a mutual distance (X) in rolling direction (2), which has the same magnitude as the magnitude of the mutual distance ($X_1$) in rolling direction of the center-lines (23) of two neighboring holding recesses (18, 19) of the corresponding side plate (10, 11), wherein a radial play between the middle portion (13) of each shaft (14) and the bore (7) of the short-roller (5) is greater than the sum of the guiding play (Z) of the ends (16, 17) of the long-rollers in the corresponding holding recess (18, 19) of the side plate (10, 11) plus the running play (Y) between long-roller (3) and short-roller (5), so that the short-rollers (5) of the cage (1, 30) are guided in rolling direction and continuously adjusted in a position without obliquity by merely slidingly contacting the outer surface of the neighboring long-roller during bearing operation.

2. Cage according to claim 1, characterized in that the mutual running play (Y) between long-roller (3) and short-roller (5) in the cage (1, 30) is about 4% of the diameter (D) of the outer surface (4) of the long-roller (3).

3. Cage according to claim 2, characterized in that guiding play (Z) of both ends (16, 17) of the long-rollers (3) in the holding recess (18, 19) of the corresponding side plate (10, 11) of the cage (1, 30) is about 3% of the outer diameter (D) of the outer surface (4) of the long-roller (3).

4. Cage according to claim 3, characterized in that both guiding surfaces (22) of each holding recess (18, 19) have a surface section bearing on an outer surface (4) of the corresponding long-roller (3), said surface section having a width (t) oriented in a direction of a center-line (23) of the recess (18, 19), the magnitude of said width (t) being about 20 % of the diameter (D) of the outer diameter (4) of the long-roller (3).

5. Cage according to claim 1, wherein an outer diameter of the long-rollers and an outer diameter of the short-rollers are the same size and that both rollers are manufactured from the same elastic material.

6. Cage according to claim 5, wherein said elastic material is bearing steel.

7. Cage according to claim 5, wherein the long-rollers (3) are made solid.

8. Cage according to claim 1, characterized in that each shaft (14) of the cage (1, 30) has a middle portion (13) joining a pair of reduced portions (24) formed on either end of said portion (13), the reduced portion (24) being inserted into a hole (25) formed in an inner side face (20, 21) of the corresponding side plate (10, 11), wherein both opposing inner side faces (20, 21) rest against an adjacent shoulder (26) formed at the junction between the middle portion (13) and the corresponding reduced portion (24) of the shaft (14).

9. Cage according to claim 8, characterized in that each hole (25) in the two side plates (10, 11) is made a through hole, wherein each reduced portion (24) of the shaft (14) of the cage (1, 30) passes through the hole (25) of the corresponding side plate (10, 11) with an end portion protruding beyond an outer side face (27, 28) of the side plate (10, 11), said end portion of the reduced portion being thickened by riveting so as to become placed against said outer side face (27, 28).

10. Cage according to claim 1, for a linearly movable roller bearing having a linear raceway connected to a joining reversing raceway, said reversing raceway having a groove which receives the short-rollers passing along the reversing raceway, the width of said groove being greater than the length of the short-rollers, characterized in that both side plates of the cage (30) comprise:

plate links (38) arranged in said rolling direction (2) one after another and having end portions (39, 40) extending in a rolling direction, wherein the end portions (39, 40) of neighboring links (38) overlap each other and are structured and arranged to swing freely about a swivel pin (41), wherein a center-line (42) of each pin (41) coincides with the center-line (23) of the guiding surfaces (22) of each holding recess (18, 19), and which links (41) have a middle portion (45), which is rigidly fixed onto the side end of the corresponding shaft (14).

11. Cage according to claim 1, characterized in that both side plates of the cage are made as one piece and formed as a circular ring.

\* \* \* \* \*